United States Patent [19]

Holsapple, III

[11] 4,128,941

[45] Dec. 12, 1978

[54] SHEATHED RAZOR BLADE

[76] Inventor: Earle T. Holsapple, III, 758 Springfield Ave., Summit, N.J. 07901

[21] Appl. No.: 835,577

[22] Filed: Sep. 22, 1977

[51] Int. Cl.² .............................................. B26B 29/02
[52] U.S. Cl. ........................................ 30/151; 53/550
[58] Field of Search ................. 30/346.5, 151; 53/180, 53/33; 40/2 R; 53/200

[56] References Cited

U.S. PATENT DOCUMENTS

| | | | |
|---|---|---|---|
| 2,276,282 | 3/1942 | Bindszus | 53/180 X |
| 2,816,653 | 12/1957 | Jacobi | 40/2 R |
| 2,877,121 | 3/1959 | Anderson | 53/180 X |
| 3,477,194 | 11/1969 | Corrsin | 53/33 |

*Primary Examiner*—Jimmy C. Peters
*Attorney, Agent, or Firm*—Norman N. Popper; Daniel H. Bobis

[57] ABSTRACT

A sheathed razor blade in which a folded film sheath embraces the blade, with the fold in general registration with the cutting edge of the blade; the folded film sheath overlapping the sides of the blade; the overlap of the folded film sheath bonded together to form a relatively stiff, lateral two ply enlargement beyond the side of the blade for removing the sheath.

4 Claims, 5 Drawing Figures

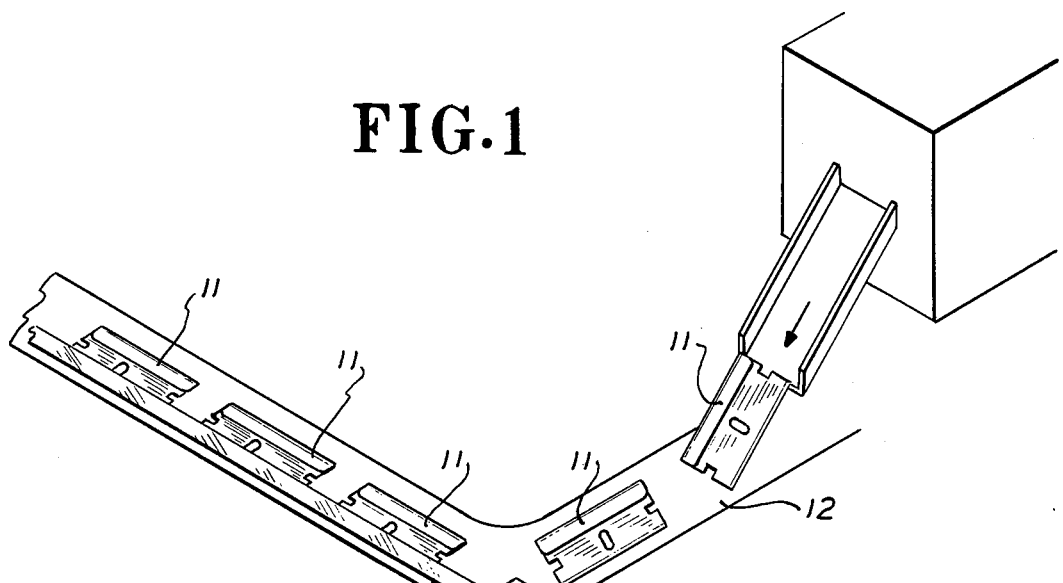
FIG.1
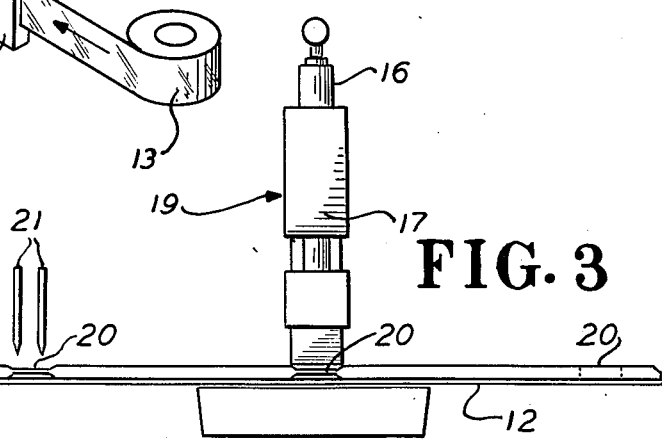
FIG.2
FIG.3
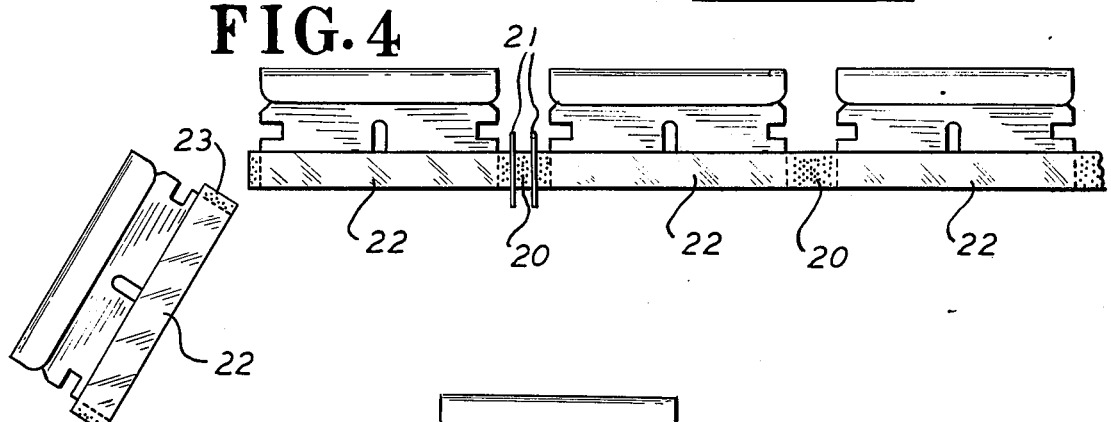
FIG.4
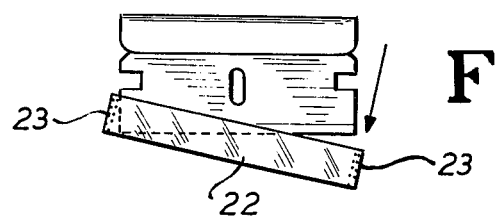
FIG.5

SHEATHED RAZOR BLADE

BACKGROUND OF THE INVENTION

1. FIELD IF INVENTION

This invention relates generally to protected edge razor blades, and specifically to folded film sheath on a razor blade, having stiffened, welded, overlapped side portion for easy removal of the protective sheath.

2. PRIOR ART

Razor blades have frequently been produced in protective packages, to secure them against edge damage. Protective envelopes have also been utilized for that purpose, with perforations to enable a portion of the envelope to be torn away. Plastic strips have been molded into blade edges. Production costs have been high, the protection has not been altogether secure, and removal of the sheath has been attended with some difficulty.

SUMMARY OF INVENTION

It has been found that a thermoplastic folded sheet can be applied to a razor blade cutting edge, with portions of the thin, soft film comprising the folded sheet overlapping the blade at both sides. The folded sheet forms a soft protective sheath for the edge that will not be damaged. The opposing overlapped portions of the sheet beyond the side of the razor blade are welded together causing the sheath to closely embrace the blade. The two ply, overlapped portions of the sheet by being bonded together form a relatively stiff lateral overlap by which the sheath can be removed, yet without damage to the cutting edge. Simple lateral pressure on the overlap removes the sheath. Yet without this lateral pressure, the blade remains firmly and securely sheathed.

DRAWINGS

These objects and advantages as well as other objects and advantages may be achieved by the device shown by way of illustration in the drawings in which, FIG. 1 is a perspective view of spaced, successive blades on a conveyor belt receiving a folded thermoplastic sheet of film on their cutting edges;

FIG. 2 is a view of the contact surface of the sonic head;

FIG. 3 is an elevational view of the ultrasonic welding station and cutting station;

FIG. 4 is a top plan view of a series of blades with the sheath applied, passing a cutting station; and FIG. 5 is a view of a blade with the sheath partially removed.

PREFERRED EMBODIMENT

Referring now to the drawings in detail, a series of razor blades 11 may be produced by any of the well know methods. They are assembled in spaced relation to each other on a conveyor belt 12. A roll of thermoplastic film 13 is passed through a folder 14 so that it is folded upon itself and embraces the blades 11 successively as they move in spaced relation to each other toward a ultrasonic welder 19. An air cylinder 16 operated in timed relation to the position and progress of the blades, moves a horn 17 downwardly until the contact surface 18 of a sonic welder 19 engages a folded overlapped portion 20 of the thermoplastic film 13 between the successive baldes. Ultrasonic impulses applied to the film 13 at the interface of the contact surface 18 with the overlapped portions 20 welds the soft thermoplastic film together at the side of the blades to form a sheath 22 as shown in FIG. 4. The contact surface 18 may be provided with a stippled or dimpled surface, and this configuration is imparted to the welded overlap portion 20. The blades 11 then move toward cutters 21 which sever the blades from each other as shown in FIG. 4, leaving an overlap 23. The blades have single edges for illustrative purposes, but double edge blades may be protected in the same way. Ultrasonic welding is well known and may be accomplished by the "Sonipress" produced by Sonics & Materials, Kenosia Avenue, Danbury, Conn. 06810.

In addition to ultrasonic welding to seal the overlap of the film, microwave fusion is well known and may be the electronic means of welding the film.

Other procedures for bonding the overlap 20 is by the use of a tape having a dress of pressure sensitive adhesive, or by inserting an adhesive between the plys of the film.

The overlapped portions 20 of the film, no longer are soft and pliable but become stiffer. Fingernail pressure (indicated by the arrow in FIG. 5) to the end of the sheath at the overlap 23, disengages the sheath 22, and the soft film at the blade does not damage the cutting edge.

Although many plastic sheet materials may be used, polyvinyl chloride is preferred in a thickness of 0.005 inches.

What is claimed:

1. A sheathed razor blade comprising:
   a. a razor blade having a cutting edge,
   b. a folded sheet covering the portion of both sides of the razor blade adjacent to the cutting edge,
   c. the fold of the sheath in general registration with the cutting edge of the blade,
   d. portions of the sheath extending laterally perpendicular to and beyond sides of the razor blade adjacent to the cutting edge, defining a small perpendicular tab at the sides of the blade, enabling the sheath to be picked off,
   e. the portions of the sheath extending beyond the sides of the blade adjacent to the edge overlapped at least in part with each other,
   f. the overlapped portions of the sheet at the sides adjacent to the cutting edge adhered to each other.
2. A sheathed razor blade comprising:
   a. the device according to claim 1,
   b. the sheath of polyvinyl chloride film.
3. A sheathed razor blade comprising:
   a. the device according to claim 1,
   b. the sheath composed of plastic material.
4. A sheathed razor blade comprising:
   a. the device according to claim 1,
   b. the sheath composed of thermoplastic material.

* * * * *